3,189,207
AEROSOL-TYPE PACKAGE
Clarence A. Heyne and John R. Johnson, Toledo, Ohio, assignors to Owens-Illinois Glass Company, a corporation of Ohio
Filed Feb. 15, 1963, Ser. No. 258,850
4 Claims. (Cl. 215—38)

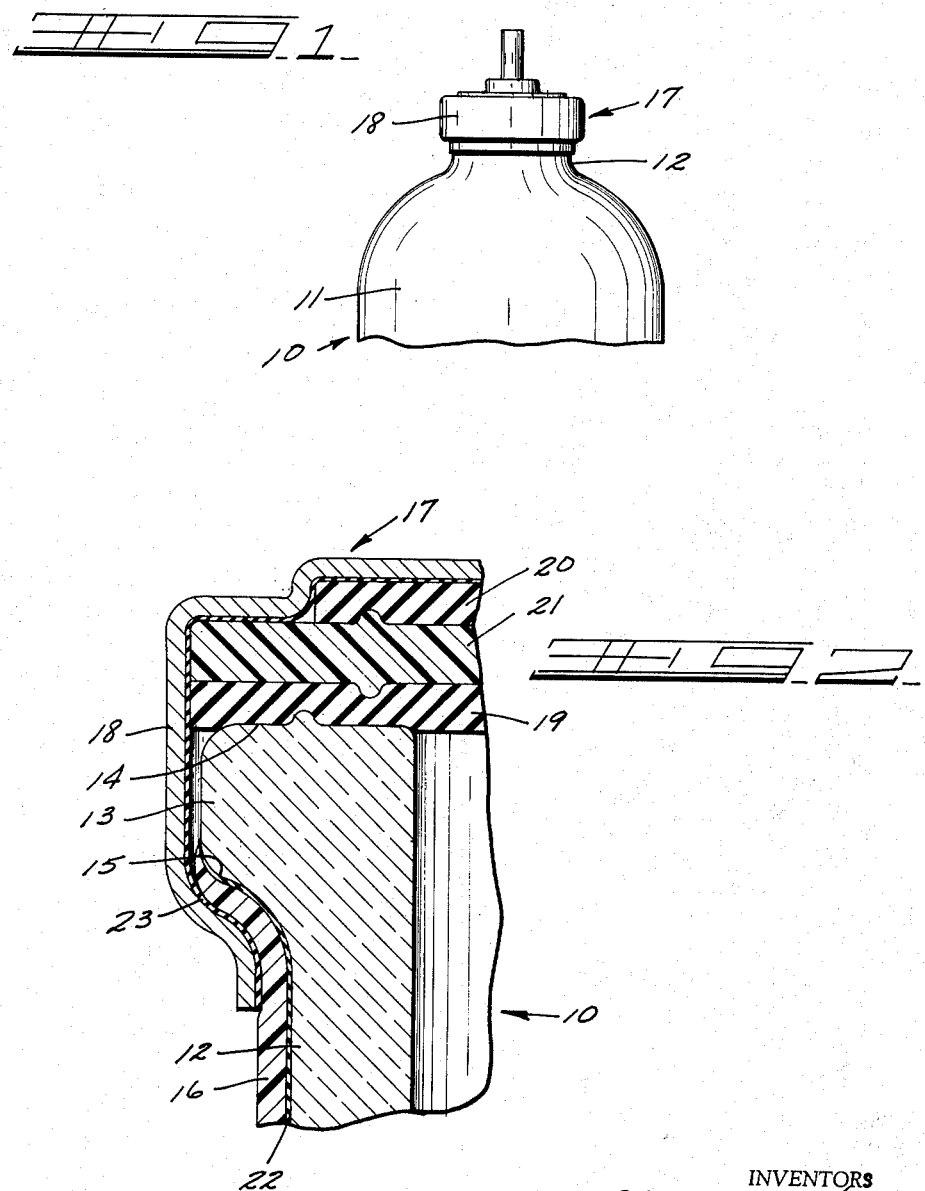

Our invention is an improved aerosol-type package, such package in general resembling that forming the subject matter of U.S. Patent No. 3,014,607, issued December 26, 1961, to H. A. Barnby et al. and owned by the assignee of the present application.

Because aerosol-type or "pressure" containers formed of glass or the like material may and too often do fracture under pressure generated by the contents, with resultant glass shattering and consequent potentially serious injury to personnel, efforts have been made to minimize, if not entirely eliminate the possibility of glass shattering by encasing the container in an expansible sheath of plastisol or some similar thermoplastic material. Such coating has elasticity and possesses cushion-like characteristics for well-known reasons which are spelled out in the above-identified patent. To date, however, one important factor appears to have been overlooked, viz., the absence of means to insure against separation of the closure from the sheath incident to glass breakage. As a consequence present-day packages of this sort do not afford the ultimate in protection against explosion.

An important object of our invention, therefore, is to provide a permanent reliable bond between the closure and the bottle sheath to the end that the closure simply cannot break away from the sheath, but instead will reliably supplement the latter in completely confining glass fragments in case of explosion.

A further object of our invention is the provision of a resinous bond between the interior of the closure cap and an adjacent marginal portion of the plastisol sheathing, which will effectively resist separation of these two elements, one from the other, under pressure of expanding gas and broken glass.

Other objects will be in part apparent and in part pointed out hereinafter.

In the accompanying drawings forming a part of our application:

FIG. 1 is a fragmentary side elevational view of a package embodying our invention.

FIG. 2 is an enlarged transverse sectional view through one wall of the package neck, disclosing the preferred form of our invention.

Our invention is illustrated incorporated in a pressure-type container of more or less conventional form, such being a glass bottle 10 including a body 11 having a reduced upstanding neck 12 provided with a radially enlarged head 13 or rim portion. This head provides an annular top sealing surface 14 or rim and therebelow an external downwardly and inwardly directed annular abutment or shoulder 15. A sheath 16 or coating of plastisol or some vinyl resin dispersion or suspension material encases the bottom and sidewall of the bottle body and the neck to a point near the upper margin of the abutment or shoulder 15, such sheath being securely bonded to the glass as will be explained presently. A dispensing-type closure 17 or fitment is telescoped over the head 13, such closure having a depending annular attaching skirt 18 spun over or contracted to the contour of the shoulder 15. Although other sealing means may well be utilized, we have disclosed same as comprising inner and outer rubber or rubber composition gaskets 19 and 20, respectively, and an intermediate nylon disc 21. The inner rubber gasket 19 lies snugly against the top sealing surface 14 of the bottle neck 12.

The plastisol sheath 16 is secured to the bottle through a procedure involving first applying a primer coat 22 or bonding agent to the bottle exterior and then dipping the coated bottle into a bath of the plastisol in such fashion as to create a sheath of the desired thickness. The primer coat 22 may well be broadly defined as an amino alkyl-alkoxy silane, excellent results also being obtainable when the silane has at least one alkyl group and at least one ethoxy group directly linked to the silicon atom.

According to our invention the closure cap 17, which is formed of sheet metal, is coated internally with a film 23 or layer of a primer or bonding agent (an epoxy resin for example) capable of strong adhesion to both metal and a lacquer or the like coating for a closure and the plastisol sheath. At this stage the attaching skirt is of straight cylindrical form to facilitate telescoping same over the bottle neck. Following initial placement of the closure cap over the head 13 and of course filling of the bottle with the desired product, the attaching skirt 18 is spun or rolled into firm holding engagement with the shoulder 15, with the upper marginal portion of the plastisol sheath 16 and the primer coats interposed between the skirt and shoulder. Thereupon heat is applied locally to the inwardly spun section of the skirt adequate to reactivate the resin or like primer, causing it to permanently secure the closure and sheath together. Such heating may be effected by any preferred device, many of which are available, or easily designed for the purpose. Thus despite the character of breakage that might occur later, the closure cap remains securely bonded to the plastisol sheath and these elements together provide a complete casing for the glass, precluding any possibility of glass shattering and injury to personnel.

An example of epoxy resins useable as an internal coating for the closure cap and to bond same to the sheathing is:

| | Percent |
|---|---|
| Epoxy resin (Epon 1007) | 16.5 |
| Methyl methacrylate resin (Acryloid A–101) | 7.0 |
| Diethylene triamine | 0.66 |
| Methyl isobutyl ketone | 25.40 |
| Methyl ethyl ketone | 50.44 |
| | 100.00 |

We have found that a resin substantially as just described becomes reactivated and will bond the closure cap and sheath together when heated to approximately 180° F. to 200° F.

Should the above formula be modified by substituting dicyandiamide for diethylene triamine in like amount, the resin will reactivate and create an effective bond when heated to between about 180° F. and 350° F. Thus the resin selected may well be determined by the characteristics of the product being packaged and the extent and degree of heat it can withstand during the final closing phase. The reactivation time and temperature vary over a wide range only as dictated by the production speed desired. The shorter the closing time, etc., the higher the temperature needed.

Modifications may be resorted to within the spirit and scope of the appended claims.

We claim:

1. In a package, a glass container comprising a body and a mouth-defining neck having an annular external generally downwardly facing shoulder, a sheath of thermoplastic material intimately encasing the container up to about the upper margin of the shoulder, a sheet metal closure telescoped over the neck with an attaching skirt in part overlying a part of said sheath and contracted into holding engagement with the shoulder and a bonding agent securing the closure skirt directly to underlying areas of the sheath.

2. A package as defined in claim 1, there being a primer bonding the sheath and container together.

3. A package as defined in claim 1, the bonding agent being a film of resinous material reactivatable by the application of heat at a prescribed temperature thereto.

4. In a package, a glass container comprising a body and a mouth-defining neck at an end of said body, a sheath of thermoplastic material intimately encasing the container body to a point near the mouth, a skirted sheet-metal closure cap telescoped over the neck to seal the container mouth and having its skirt overlying a part of said sheath, and a bonding agent securing the closure cap skirt to the sheath whereby to provide a continuous cover for the entire glass portion of the package.

References Cited by the Examiner

UNITED STATES PATENTS

| | | |
|---|---|---|
| 2,081,152 | 5/37 | Replogle et al. |
| 2,500,549 | 3/50 | Ketay et al. _____ 215—38 |
| 3,014,601 | 12/61 | Barnby et al. _____ 215—12 |
| 3,131,077 | 4/64 | Barnby et al. |

FOREIGN PATENTS

| | | |
|---|---|---|
| 495,675 | 9/50 | Belgium. |
| 527,161 | 7/56 | Canada. |
| 529,792 | 8/56 | Canada. |

THERON E. CONDON, *Primary Examiner.*

GEORGE O. RALSTON, *Examiner.*